(12) United States Patent
Fujita et al.

(10) Patent No.: US 11,036,314 B2
(45) Date of Patent: Jun. 15, 2021

(54) COVER MEMBER FOR INPUT PEN DEVICE, AND INPUT PEN DEVICE

(71) Applicant: NIPPON ELECTRIC GLASS CO., LTD., Otsu (JP)

(72) Inventors: Naoki Fujita, Otsu (JP); Shinsaku Nishida, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 0 days.

(21) Appl. No.: 16/650,162

(22) PCT Filed: Aug. 28, 2018

(86) PCT No.: PCT/JP2018/031677
§ 371 (c)(1),
(2) Date: Mar. 24, 2020

(87) PCT Pub. No.: WO2019/058889
PCT Pub. Date: Mar. 28, 2019

(65) Prior Publication Data
US 2020/0301521 A1 Sep. 24, 2020

(30) Foreign Application Priority Data
Sep. 25, 2017 (JP) .............................. JP2017-183970

(51) Int. Cl.
*G06F 3/0354* (2013.01)
*C03C 19/00* (2006.01)
*G06F 3/041* (2006.01)

(52) U.S. Cl.
CPC .......... *G06F 3/03545* (2013.01); *C03C 19/00* (2013.01); *G06F 3/041* (2013.01)

(58) Field of Classification Search
None
See application file for complete search history.

(56) References Cited

U.S. PATENT DOCUMENTS
2017/0235418 A1* 8/2017 Inamoto .................. C03C 17/32
359/601

FOREIGN PATENT DOCUMENTS
JP 2009151476 A 7/2009
JP 2016099671 A 5/2016
(Continued)

OTHER PUBLICATIONS

International Search Report for corresponding PCT/JP2018/031677, dated Oct. 2, 2018.
(Continued)

*Primary Examiner* — David D Davis
(74) *Attorney, Agent, or Firm* — Cantor Colburn LLP

(57) ABSTRACT

A cover member for an input device is disposed on a front-surface side of a display device in the input device includes recesses and protrusions on at least one principal surface. In the principal surface having recesses and protrusions, when a cutoff value for a high-pass filter λc is set to 1.6 times the pitch of the recesses and protrusions of a measured cross-sectional curve and a cutoff value for a low-pass filter λs is set to 25 μm, the maximum roughness height Rz of the recesses and protrusions is 3-1000 nm and the pitch RSm of the recesses and protrusions is 50-1000 μm, and when the cutoff value of the high-pass filter λc is set to 25 μm, the three-dimensional arithmetic mean height Sa of the recesses and protrusions is 1-50 nm and the pitch RSm of the recesses and protrusions is 0.01-10 μm.

6 Claims, 3 Drawing Sheets

(56) References Cited

FOREIGN PATENT DOCUMENTS

| JP | 2017102864 A | 6/2017 | | |
| WO | WO-2019058889 A1 | * | 3/2019 | ............. G06F 3/041 |

OTHER PUBLICATIONS

International Prelminary Report on Patentability with Written Opinion of the International Searching Authority; International Application No. PCT/JP2018/031677; dated Mar. 31, 2020.

* cited by examiner

COVER MEMBER FOR INPUT PEN DEVICE, AND INPUT PEN DEVICE

CROSS REFERENCE TO RELATED APPLICATIONS

This is the U.S. national stage of application No. PCT/JP2018/031677, filed on Aug. 28, 2018. Priority under 35 U.S.C. § 119(a) and 35 U.S.C. § 365(b) is claimed from Japanese Application No. 2017-183970, filed Sep. 25, 2017, the disclosure of which is also incorporated herein by reference.

TECHNICAL FIELD

The present invention relates to a cover member for an input device, and the input device.

BACKGROUND ART

Conventionally, a pen input device that can input characters and figures using an input pen is known.

In such a pen input device, a transparent cover member constituted of a glass substrate or the like is disposed on a front-surface side of a display device such as a liquid crystal display, and the input pen is brought into contact with and moved with respect to the cover member. Thus, various input operations can be performed. When the glass substrate is used as the cover member for the pen input device, a surface of the glass substrate is generally smooth with small recesses and protrusions. Therefore, a nib slides when the input pen is moved in contact with the surface of the glass substrate, thereby causing a problem of uncomfortable writing.

For example, in Patent Literature 1, in order to improve a writing feel of an input pen in a pen input device, it is disclosed that a resin layer (antiglare layer) consisting of an active energy ray curable resin composition and having recesses and protrusions is formed on a surface of a cover member. An average interval of the recesses and protrusions is 5 to 500 µm.

CITATIONS LIST

Patent Literature

Patent Literature 1: JP-A 2009-151476 Gazette

SUMMARY OF INVENTION

Technical Problems

However, in the resin layer formed on the surface of the cover member described above, when the input pen is moved in contact with the surface of the cover member, a nib is caught too much and difficult to slide, thereby making it difficult to obtain a good writing feel.

In view of this, the present invention provides a cover member for an input device and the input device in which a writing feel of input means such as an input pen is excellent.

Solutions to Problems

A cover member for an input device and the input device that solve the above problems have the following characteristics.

In other words, the cover member for an input device according to the present invention is disposed on a front-surface side of a display device in the input device. The cover member includes recesses and protrusions on at least one principal surface. In the principal surface having the recesses and protrusions, when a cutoff value for a high-pass filter λc is set to a value 1.6 times a pitch of recesses and protrusions of a measured cross-sectional curve and a cutoff value for a low-pass filter λs is set to 25 µm, a maximum roughness height of the recesses and protrusions is 3 to 1000 nm and a pitch of the recesses and protrusions is 50 to 1000 µm, and when a cutoff value for a high-pass filter λc is set to 25 µm, a surface roughness (three-dimensional) arithmetic mean height Sa of the recesses and protrusions is 1-50 nm and a pitch of the recesses and protrusions is 0.01 to 10 µm.

With such a configuration, an operation of input means such as an input pen to the input device can be performed so that the input means is neither too difficult nor too easy to slide, and the input means such as the input pen can be excellent in writing feel.

Further, a haze is less than 10% in a wavelength range of visible light.

Thereby, transparency of the cover member for an input device can be maintained, and visibility of the display device can be maintained.

Further, an input device includes the cover member for an input device according to the first or second aspect, a display device, and a detection circuit for detecting an input.

Thereby, a writing feel of input means such as an input pen for performing an input to the input device can be improved.

Further, the input device includes an input pen that performs an input to the input device by moving in contact with a principal surface of the cover member for an input device.

With such a configuration, the writing feel of the input pen with respect to the input device can be improved.

Advantageous Effects of Invention

According to the present invention, a writing feel of input means such as an input pen which performs an input with respect to an input device can be made excellent.

DESCRIPTION OF EMBODIMENT

Next, an embodiment for implementing a cover member for an input device and an input device according to the present invention will be described with reference to the accompanying drawings.

Figure 1:
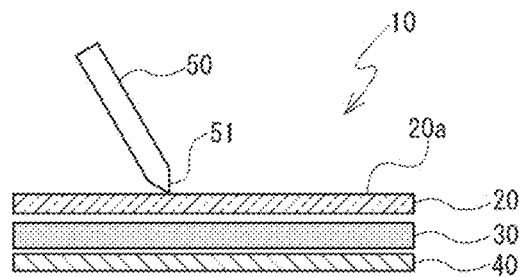
FIG. 1 is a schematic side sectional view showing an input device.

An input device 10 shown in FIG. 1 is an embodiment of an input device including a cover member for an input device according to the present invention.

The input device 10 includes a display element 30 for displaying an image, a glass substrate 20 as a cover member disposed on a front-surface side of the display element 30, a digitizer circuit 40 disposed on a back-surface side of the display element 30, and an input pen 50. The glass substrate 20 is an example of the cover member for an input device according to the present invention, and the digitizer circuit 40 is an example of a detection circuit that detects an input according to the present invention.

Note that the "front-surface side" of the display element 30 refers to a side on which an image is displayed, and the "back-surface side" of the display element 30 refers to a side opposite to the side on which the image is displayed. In FIG. 1, the "front-surface side" of the display element 30 is above a paper surface, and the "back-surface side" thereof is below the paper surface.

The input device 10 can input characters and figures by moving the input pen 50 in contact with the glass substrate 20. An input to the input device 10 can also be performed by input means other than the input pen 50. For example, by moving a user's finger in contact with the glass substrate 20, it is possible to input characters and figures.

The input device 10 is a tablet terminal, for example. The tablet terminal widely means an input display device having a display function and an input function. The tablet terminal includes devices such as a tablet PC, a mobile PC, a smartphone, and a game machine.

The glass substrate 20 is formed of a transparent glass plate having recesses and protrusions formed on at least one principal surface 20a. As the glass substrate 20, for example, a glass plate made of aluminosilicate glass or borosilicate glass can be used. When the glass substrate 20 is a glass plate made of alkali-containing aluminosilicate glass, the glass substrate 20 may have a chemically strengthened layer on a surface. Note that details of the glass substrate 20 will be described later.

The glass substrate 20 is disposed so as to be a surface on a side where the input pen 50 comes into contact with the principal surface 20a formed with the recesses and protrusions.

The digitizer circuit 40 includes a detection sensor that detects an input by input means such as the input pen 50.

The input pen 50 is an input tool having a shape similar to a writing instrument such as a pencil or a ballpoint pen, and a nib 51 in contact with the glass substrate 20 is made of a synthetic resin material such as elastomer or polyacetal resin, or felt. The nib 51 formed of these members is easily caught by the recesses and protrusions. Therefore, a writing feel is particularly excellent when the nib 51 of the input pen 50 is moved in contact with the principal surface 20a of the glass substrate 20 formed with the recesses and protrusions.

In the present embodiment, the glass substrate 20 is used as the cover member for an input device. However, the present invention is not limited to this, and it is also possible to use as the cover member a resin substrate formed of synthetic resin and having at least one principal surface formed with recesses and protrusions. In this case, the recesses and protrusions of the resin substrate can be formed, for example, by performing blasting such as wet blasting on the principal surface of the resin substrate or embossing on the principal surface of the resin substrate.

Moreover, it is also possible to use as the cover member a resin layer having a surface formed with recesses and protrusions formed on at least one principal surface of a glass substrate. In this case, the cover member can be configured by sticking a resin sheet having a surface formed with recesses and protrusions to the principal surface of the glass substrate. The recesses and protrusions of the resin sheet can be formed, for example, by performing embossing on the surface of the resin sheet or by forming a synthetic resin mixed with powder particles into a sheet shape. Further, the resin layer can be formed by spraying synthetic resin on the principal surface of the glass substrate.

However, when the glass substrate 20 is used as the cover member, a surface hardness is higher than that when the resin substrate or the resin layer formed on the principal surface of the glass substrate is used, so that it is advantageous in that the surface is hardly damaged.

Next, the glass substrate 20 will be described.

The glass substrate 20 is an embodiment of the cover member for an input device according to the present invention.

Recesses and protrusions are formed on the principal surface 20a of the glass substrate 20.

Figure 2:
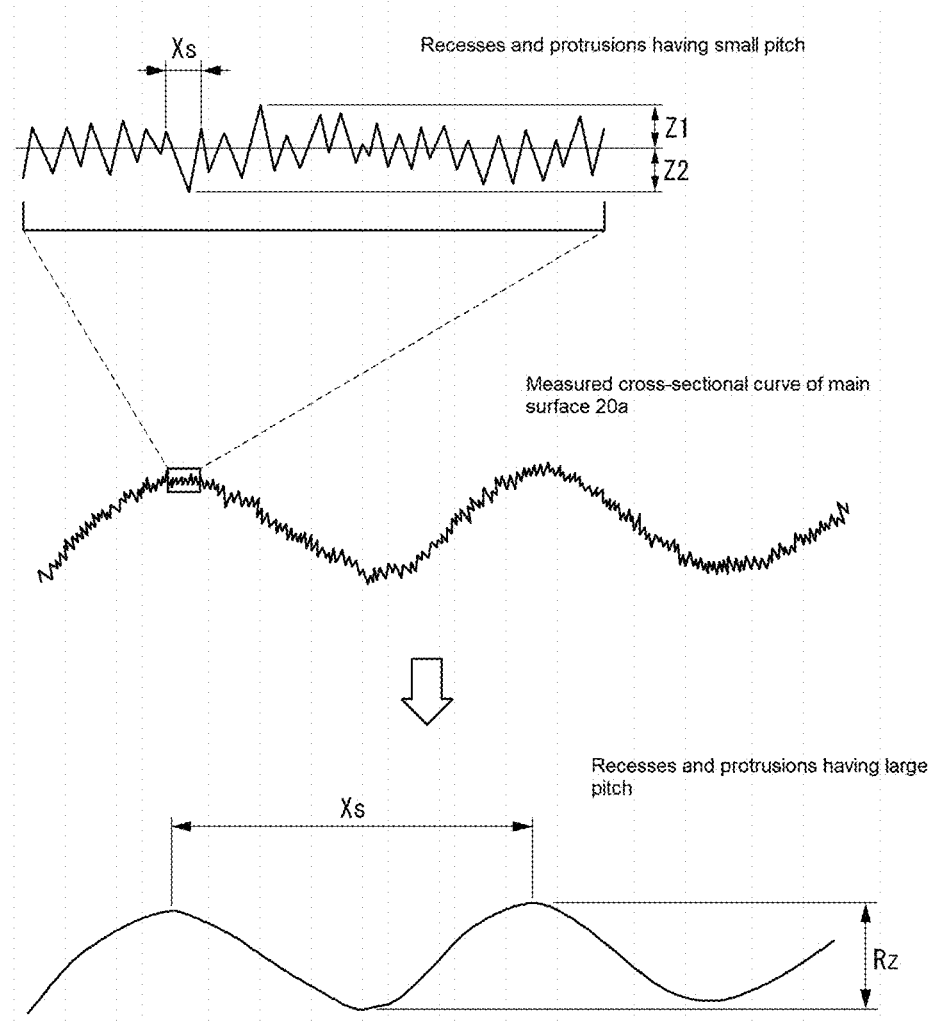
FIG. 2 is a diagram showing a measured cross-sectional curve of a principal surface, recesses and protrusions having a large pitch, and recesses and protrusions having a small pitch.

As shown in FIG. 2, the recesses and protrusions are constituted of two types of large and small recesses and protrusions having different pitches of recesses and protrusions. Recesses and protrusions having a large pitch has a maximum roughness height Rz of 3 nm to 1000 nm and a pitch RSm of the recesses and protrusions of 50 µm to 1000 µm. Further, recesses and protrusions having a small pitch has a three-dimensional arithmetic mean height Sa of 1 nm to 50 nm and a pitch RSm of the recesses and protrusions of 0.01 µm to 10 µm.

The maximum roughness height Rz is preferably larger than the three-dimensional arithmetic mean height Sa. Further, the maximum roughness height Rz is more preferably 1.1 to 500 times the three-dimensional arithmetic mean height Sa.

Here, in the recesses and protrusions having the large pitch, the maximum roughness height Rz is the sum of the highest peak height and the deepest valley depth in the recesses and protrusions, and the pitch RSm of the recesses and protrusions is a mean of cycle lengths Xs of the recesses and protrusions at a predetermined reference length.

Further, in the recesses and protrusions having the small pitch, the three-dimensional arithmetic mean height Sa is a mean of absolute values of a peak height Z1 and a valley depth Z2 of the recesses and protrusions in a predetermined three-dimensional region, and the pitch RSm of the recesses and protrusions is a mean of cycle lengths Xs of the recesses and protrusions at a predetermined reference length.

Figure 3:
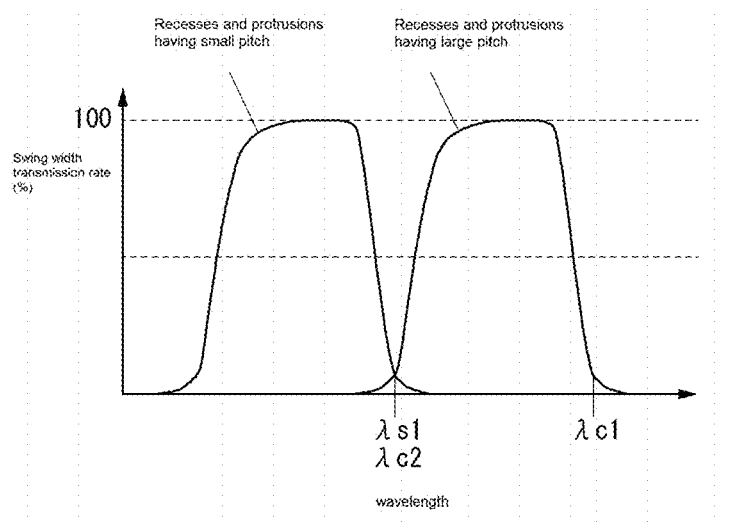
FIG. 3 is a diagram showing cutoff values for a high-pass filter λc and a low-pass filter λs.

As shown in FIGS. 2 and 3, values of the maximum roughness height Rz and the pitch RSm of the recesses and protrusions in the above-described recesses and protrusions having the large pitch are obtained when a cutoff value $\lambda c1$ for a high-pass filter $\lambda c$ for blocking a long wavelength component from a measured cross-sectional curve of the principal surface 20a is set to 1.6 times the pitch of the recesses and protrusions of the measured cross-sectional curve and a cutoff value $\lambda s1$ for a low-pass filter $\lambda s$ for blocking a short wavelength component from the measured cross-sectional curve of the principal surface 20a is set to 25 µm.

In addition, values of the three-dimensional arithmetic mean height Sa and the pitch RSm of the recesses and protrusions in the above-described recesses and protrusions having the small pitch are obtained when a cutoff value $\lambda c2$ for a high-pass filter $\lambda c$ for blocking a long wavelength component from the measured cross-sectional curve of the principal surface 20a is set to 25 µm.

Note that in the measured cross-sectional curve of the principal surface 20a, by applying the high-pass filter λc having the cutoff value λc2, a swell component and a component of the recesses and protrusions having the large pitch of the principal surface 20a are removed, and a curve of the recesses and protrusions having the small pitch is obtained.

Since a shape of the recesses and protrusions having the large pitch and a shape of the recesses and protrusions having the small pitch on the principal surface 20a of the glass substrate 20 are within such a range, in the input device 10, visibility of the display element 30 can be maintained, and a writing feel of input means such as the input pen 50 can be improved. In addition, it is possible to suppress occurrence of glare called sparkling caused by interference of scattered light due to the formed recesses and protrusions. Furthermore, when the resin layer is not formed and the shape of the recesses and protrusions is directly formed on the principal surface 20a of the glass substrate 20, scratch resistance is high and the scratch is hardly made, so that the visibility of the display element 30 will not be reduced.

The recesses and protrusions having the large pitch affect contact between the principal surface 20a and the nib 51 of the input pen 50. The nib 51 comes into contact with the principal surface 20a of the glass substrate 20 at protrusions of the recesses and protrusions having the large pitch, but does not contact at recesses of the recesses and protrusions having the large pitch. Thereby, by a combination of appropriate increase and decrease in frictional force between the nib 51 and the principal surface 20a, excessive increase and decrease in frictional force between the nib 51 and the principal surface 20a can be prevented, and a writing feel with the input pen 50 can be improved. In addition, even when a user's finger is moved in contact with the glass substrate 20, the finger can be moved moderately and smoothly, and the writing feel when inputting with the finger can be improved. In this way, it is possible to improve the writing feel of input means such as the input pen 50 and the finger.

An upper limit value of the maximum roughness height Rz of the recesses and protrusions having the large pitch is set to 1000 nm, but is preferably set to 500 nm, and more preferably set to 200 nm.

Further, a lower limit value of the maximum roughness height Rz of the recesses and protrusions having the large pitch is set to 3 nm, but is preferably set to 4 nm, and more preferably set to 5 nm.

An upper limit value of the pitch RSm of the recesses and protrusions having the large pitch is set to 1000 μm, but is preferably set to 900 μm, and more preferably set to 800 μm.

The recesses and protrusions having the small pitch contributes to an increase in frictional force between the principal surface 20a of the glass substrate 20 and the nib 51. Thereby, it is possible to suppress sliding of the nib 51 on the principal surface 20a of the glass substrate 20, and to improve a writing feel of the input pen 50. In addition, even when a user's finger is moved in contact with the glass substrate 20, the finger can be moved moderately and smoothly, and the writing feel when inputting with the finger can be improved. In this way, it is possible to improve the writing feel of input means such as the input pen 50 and the finger.

An upper limit value of the three-dimensional arithmetic mean height Sa of the recesses and protrusions having the small pitch is set to 50 nm, but is preferably set to 40 nm, and more preferably set to 30 nm.

An upper limit value of the pitch RSm of the recesses and protrusions having the small pitch is set to 10 μm, but is preferably set to 7 μm, and more preferably set to 5 μm.

A lower limit value of the pitch RSm of the recesses and protrusions having the small pitch is set to 0.01 μm, but is preferably set to 0.1 μm, and more preferably set to 0.5 μm.

In addition, the principal surface 20a of the glass substrate 20 is particularly well-written with respect to the nib 51 formed of a member that is likely to catch on recesses and protrusions, such as the resin material such as elastomer or polyacetal resin, and the felt described above.

From the viewpoint of visibility of an image of the display element 30 when the image is viewed through the glass substrate 20, the glass substrate 20 is formed so that a haze representing a haze value in an index on transparency is set to less than 10% in a visible light wavelength range (380 nm to 780 nm).

By setting the haze of the glass substrate 20 to less than 10%, transparency of the glass substrate 20 can be maintained, and visibility of the display element 30 can be maintained.

In a case of the present embodiment, the haze of the glass substrate 20 is set to less than 10%, but is preferably less than 7%, more preferably less than 5%, and even more preferably less than 4%.

Further, an antireflection film for reducing a reflectance on a side on which the input pen contacts, or antifouling film for preventing attachment of fingerprints and imparting water repellency and oil repellency can be formed on the principal surface 20a of the glass substrate 20.

When the glass substrate 20 is used as the cover member for the input device 10, the antireflection film is provided on the principal surface 20a at least on a front side (side on which the input pen 50 contacts) of the glass substrate 20. In addition, when there is a gap between the glass substrate 20 and the display element 30, it is preferable to have the antireflection film on the principal surface 20a on a back side (display element 30 side) of the glass substrate 20.

As the antireflection film, for example, a dielectric multilayer film formed by alternately laminating a low refractive index film having a refractive index lower than that of the glass substrate 20 or a low refractive index film having a relatively low refractive index and a high refractive index film having a relatively high refractive index is used. The antireflection film can be formed by a sputtering method, a CVD method, or the like.

When the principal surface 20a of the glass substrate 20 has the antireflection film, recesses and protrusions of the principal surface 20a of the glass substrate 20 are formed so that recesses and protrusions on a surface of the antireflection film are in the range of the above-described surface roughness (the maximum roughness height Rz and the pitch RSm of the recesses and protrusions of the recesses and protrusions having the large pitch, and the three-dimensional arithmetic surface height Sa and the pitch RSm of the recesses and protrusions of the recesses and protrusions having the small pitch).

Further, when the principal surface 20a of the glass substrate 20 has the antireflection film, the recesses and protrusions of the principal surface 20a of the glass substrate 20 are formed so that a haze of the glass substrate 20 having the antireflection film is in the above range. Note that, when the pitch RSm of the recesses and protrusions and the three-dimensional arithmetic mean height Sa of the recesses and protrusion are measured after the antireflection film is formed, an Au film of 10 nm is formed, and then these values are measured.

When the glass substrate 20 is used as the cover member for the input device 10, the antifouling film is provided on the principal surface 20a on the front side (side on which the input pen 50 contacts) of the glass substrate 20.

The antifouling film preferably contains a fluorine-containing polymer containing silicon in a main chain. As the fluorine-containing polymer, for example, a polymer having a —Si—O—Si— unit in the main chain and a water-repellent functional group containing fluorine in a side chain can be used. The fluorine-containing polymer can be synthesized, for example, by dehydrating condensation of silanol.

When the principal surface 20a on the front side of the glass substrate 20 has the antireflection film and the antifouling film, the antireflection film is formed on the principal surface 20a of the glass substrate 20, and the antifouling film is formed on the antireflection film.

When the principal surface 20a of the glass substrate 20 has the antifouling film, or when the principal surface 20a of the glass substrate 20 has the antireflection film and the antifouling film, recesses and protrusions of the principal surface 20a of the glass substrate 20 are formed so that recesses and protrusions on a surface of the antifouling film are in the range of the above-described surface roughness (the maximum roughness height Rz and the pitch RSm of the recesses and protrusions of the recesses and protrusions having the large pitch, and the three-dimensional arithmetic surface height Sa and the pitch RSm of the recesses and protrusions of the recesses and protrusions having the small pitch).

Further, when the principal surface 20a of the glass substrate 20 has the antifouling film, or when the principal surface 20a of the glass substrate 20 has the antireflection film and the antifouling film, the recesses and protrusions of the principal surface 20a of the glass substrate 20 are formed so that the haze of the glass substrate 20 after the antifouling film is formed or the haze of the glass substrate 20 after the antireflection film and the antifouling film are formed is in the above range.

Next, a method for manufacturing the glass substrate 20 will be described.

The recesses and protrusions formed on at least one principal surface 20a of the glass substrate 20 are formed on the principal surface 20a by combining at least one or more kinds of processing methods such as wet blasting, chemical etching, or silica coating.

In the wet blasting, abrasive grains constituted of solid particles such as alumina and liquid such as water are uniformly agitated into slurry, and the slurry is injected at high speed from a spray nozzle to a glass workpiece using compressed air. Thereby, fine recesses and protrusions are formed on the workpiece. Furthermore, as the nozzle for injecting the slurry, a round nozzle in which an area of a slurry injection port is narrowed to an area of the workpiece is used. By moving the round nozzle relative to the workpiece, various surface shapes can be formed.

In the wet blasting, when the slurry injected at high speed collides with the workpiece, the abrasive grains in the slurry scrape, strike or rub a surface of the workpiece, resulting in formation of fine recesses and protrusions on the surface of the workpiece. In this case, since the abrasive grains injected onto the workpiece and fragments of the workpiece scraped by the abrasive grains are washed away by the liquid injected onto the workpiece, the number of particles remaining on the workpiece is reduced. Further, by arbitrarily causing the nozzle to scan the workpiece and partially injecting the slurry onto the surface of the workpiece, recesses and protrusions having a large pitch can be made in addition to recesses and protrusions having a small pitch. The glass substrate 20 is obtained by preparing the workpiece having the surface formed with two types of large and small recesses and protrusions having different pitches of recesses and protrusions cut into desired size and shape.

Surface roughness of the recesses and protrusions having the small pitch formed on a principal surface of the workpiece by the wet blasting can be adjusted mainly by a particle size distribution of the abrasive grains contained in the slurry and injection pressure when the slurry is injected onto the workpiece. Further, a maximum roughness height Rz and a pitch RSm of recesses and protrusions of the recesses and protrusions having the large pitch can be adjusted by a size of the nozzle for injecting the slurry, a feed pitch, and the injection pressure.

In the wet blasting, when the slurry is injected onto the workpiece, the liquid carries the abrasive grains to the workpiece, so finer abrasive grains can be used compared to dry blasting, impact when the abrasive grains collide with the workpiece is reduced, and precise processing can be performed. In this way, by performing the wet blasting on the workpiece, it is easy to form two types of large and small recesses and protrusions with different pitches of recesses and protrusions having appropriate size on the principal surface 20a of the glass substrate 20, and it is possible to improve a writing feel of input means such as the input pen 50 without impairing transparency of the glass substrate 20.

Note that in the dry blasting, processing heat is generated on the workpiece due to friction when injected abrasive grains collide with the workpiece. However, in the wet blasting, the liquid constantly cools the surface of the workpiece during the processing, so that the workpiece is not heated by the blasting. In addition, it is possible to form recesses and protrusions on the principal surface 20a of the glass substrate 20 by performing the dry blasting. However, in the dry blasting, impact when the abrasive grains collide with the principal surface 20a of the glass substrate 20 is too large, so surface roughness of the principal surface 20a on which the recesses and protrusions are formed is likely to increase, and transparency of the glass substrate 20 is likely to be impaired.

Further, the chemical etching is a process of chemically etching the principal surface 20a of the glass substrate 20 with hydrogen fluoride (HF) gas or hydrofluoric acid.

Further, the silica coating is a process of applying, to the principal surface 20a of the glass substrate 20, coating agent containing a matrix precursor such as a silica precursor and a liquid medium dissolving the matrix precursor to the principal surface 20a of the glass substrate 20 and heating it.

EXAMPLES

Next, an example of a glass substrate 20 having a principal surface 20a formed with two types of large and small recesses and protrusions with different pitches of recesses and protrusions will be described. However, the glass substrate 20 is not limited to this.

[Preparation of Samples]

In the present example, samples 1 to 7 were produced as examples of the glass substrate 20, and samples 8 to 9 were produced as comparative examples. As the glass substrate 20 used for the samples 1 to 9, an alkali-containing aluminosilicate glass having a thickness of 1.1 mm was used.

For the glass substrates 20 of the samples 1 to 7 as examples, two types of large and small recesses and protrusions having different pitches of recesses and protrusions were formed on one principal surface 20a by wet blasting. Specifically, for the glass substrates 20 of the samples 1 to 7, slurry was prepared by uniformly stirring abrasive grains constituted of alumina having a particle size of #4000 or #6000 and water. The glass substrate 20 was placed on a processing table. The wet blasting for injecting the slurry onto the entire principal surface 20a of the glass substrate 20 was performed by causing a round nozzle to scan the entire principal surface 20a while moving the round nozzle at a speed of 0.5 mm/s using air at a processing pressure of 0.1 to 0.2 MPa. The round nozzle that performs the wet blasting is a nozzle having a cross-sectional area of a slurry injection port narrowed to an area of the principal surface 20a and partially injecting the slurry onto the principal surface 20a. A pitch of the recesses and protrusions having the large pitch was varied by changing a scanning distance of the round nozzle. In addition, a maximum roughness height Rz of the recesses and protrusions having the large pitch was varied by increasing the number of scans. A three-dimensional arithmetic mean height Sa of the recesses and protrusions having the small pitch was varied by changing a particle size of alumina or changing processing pressure. As the abrasive grains, abrasive grains having a polygonal shape were used.

In the samples 2 to 7, samples were prepared by varying the scanning distance of the round nozzle from 50 to 500 μm for the pitch of the recesses and protrusions having the large pitch. The samples were prepared by varying the number of scans of the round nozzle from 2 to 15 times that of the sample 7 for the maximum roughness height Rz of the recesses and protrusions having the large pitch. The samples were prepared by changing the particle size of alumina from #4000 to 6000 and increasing the processing pressure in the range of 0.1 to 0.2 MPa for the three-dimensional arithmetic mean height Sa of the recesses and protrusions having the small pitch.

The principal surface 20a of the glass substrate 20 of the sample 8 as the comparative example is not treated. In other words, the glass substrate 20 of the sample 8 is untreated.

For the glass substrate 20 of the sample 9 as the comparative example, wet blasting for uniformly injecting slurry onto the entire principal surface 20a was performed on one principal surface 20a with a wide nozzle at a processing pressure of 0.25 MPa. The wide nozzle for performing the wet blasting is a nozzle having a slurry injection port with a large width and capable of injecting the slurry uniformly onto the entire principal surface 20a.

[Measurement of Surface Roughness]

Surface roughness of the principal surfaces 20a of the glass substrates 20 of the samples 1 to 9 was measured. The surface roughness was measured on the principal surface subjected to the wet blasting for the samples 1 to 7 and 9, and was measured on one principal surface 20a for the sample 8.

Parameters for the measured surface roughness are the maximum roughness height Rz and a pitch RSm of recesses and protrusions for the recesses and protrusions having the large pitch, and the three-dimensional arithmetic surface height Sa and a pitch RSm of recesses and protrusions for the recesses and protrusions having the small pitch. The surface roughness was measured using a white interference microscope.

The white interference microscope used was a white interference microscope (New View 7300) manufactured by Zygo Corporation, and measurement was performed based on JIS B0601-2013.

Measurement conditions for the recesses and protrusions having the large pitch are as follows. A 2.5× objective lens and a 1× zoom lens were used, and the measurement was performed for a measurement area 2827×2120 μm so that the number of camera pixels is 640×480 and the number of integrations is 1. When the maximum roughness height Rz and the pitch RSm of the recesses and protrusions of the recesses and protrusions having the large pitch were measured, a cutoff value λc1 for a high-pass filter λc was set to about 1.6 times the pitch RSm of the recesses and protrusions, and a cutoff value λs1 for a low-pass filter λs was set to 25 μm.

Measurement conditions for the recesses and protrusions having the small pitch are as follows. A 50× objective lens and 2× zoom lens were used, and the measurement was performed for a measurement area of 74×55 μm so that the number of camera pixels is 640×480 and the number of integrations is 8. When the three-dimensional arithmetic mean height Sa and the pitch RSm of the recesses and protrusions of the recesses and protrusions having the small pitch were measured, a cutoff value λc2 for a high-pass filter λc was set to 25 μm.

[Measurement Results of Surface Roughness]

Measurement results of the surface roughness performed on the samples 1 to 9 will be described.

Table 1 shows the measurement results.

TABLE 1

|  |  | Examples | | | | | | | Comparative examples | |
|---|---|---|---|---|---|---|---|---|---|---|
|  |  | Sample 1 | Sample 2 | Sample 3 | Sample 4 | Sample 5 | Sample 6 | Sample 7 | Sample 8 | Sample 9 |
| Recesses and protrusions having large pitch | Maximum roughness height [nm] | 38 | 46 | 151 | 25 | 21 | 45 | 10 | — | — |
|  | Pitch [μm] | 520 | 500 | 495 | 505 | 205 | 190 | 51 | — | — |
| Recesses and protrusions having small pitch | Sa [nm] | 4.9 | 5.0 | 5.2 | 7.5 | 4.9 | 5.1 | 4.0 | 0.2 | 7.0 |
|  | Pitch [μm] | 3.5 | 3.6 | 4.0 | 3.0 | 2.4 | 3.6 | 3.4 | — | 2.4 |
| Haze [%] |  | 1.0 | 1.0 | 0.7 | 3.6 | 1.0 | 1.1 | 1.2 | 0.6 | 3.5 |
| Visibility |  | ⊙ | ⊙ | ⊙ | ⊙ | ⊙ | ⊙ | ⊙ | ⊙ | ⊙ |
| Writing feel |  | 4.9 | 4.8 | 4.3 | 4.2 | 4.5 | 4.4 | 4.1 | 3.5 | 3.9 |
| Processing method |  | Wet blasting with round nozzle | Wet blasting with round nozzle | Wet blasting with round nozzle | Wet blasting with round nozzle | Wet blasting with round nozzle | Wet blasting with round nozzle | Wet blasting with round nozzle | — | Wet blasting with wide nozzle |

As shown in Table 1, the maximum roughness height Rz of the recesses and protrusions having the large pitch was in the range of 10 nm to 151 nm for the samples 1 to 7 as the examples, and the maximum roughness height Rz tends to increase as the number of scans of the wet blasting increases. For the sample 8 as the untreated comparative example and the sample 9 as the comparative example subjected to the wet blasting with the wide nozzle, recesses and protrusions having a large pitch were not formed.

The pitch RSm of the recesses and protrusions in the recesses and protrusions having the large pitch was in the range of 51 μm to 520 μm for the samples 1 to 7 as the examples. For the sample 8 as the untreated comparative example and the sample 9 as the comparative example subjected to the wet blasting with the wide nozzle, recesses and protrusions having a large interval were not formed.

The three-dimensional arithmetic surface height Sa in the recesses and protrusions having the small pitch was in the range of 4.0 nm to 7.5 nm for the samples 1 to 7 as the examples. The three-dimensional arithmetic surface height Sa was 0.2 nm which is smaller than that of the samples 1 to 7 for the sample 8 as the untreated comparative example, and was 7.0 nm for the sample 9 as the comparative example subjected to the wet blasting with the wide nozzle.

[Measurement of Haze]

A haze was measured for the samples 1 to 9. The haze was measured based on JIS K7361-1-1997 using an UV-VIS-NIR spectrophotometer (UV-3100PC) manufactured by Shimadzu Corporation.

[Measurement Results of Haze]

As shown in Table 1, the haze was in the range of 0.7% to 3.6% for the samples 1 to 7 as the examples, and was not largely different from those for the untreated sample 8 and the sample 9 subjected to the wet blasting with the wide nozzle.

[Evaluation of Visibility]

When the glass substrates 20 of the samples 1 to 9 were placed on the front-surface side of the display element 30, visibility of an image displayed on the display element 30 in the input device 10 was evaluated. As an evaluation method, whether or not a blur is seen in the image displayed on the display element 30 was evaluated in the following three stages.

◎: A vivid image is seen, and no blur is seen in the image.
○: An image is sufficiently visible, but there is a slight blur of the image.
x: An image is unclear, and a blur of the image is conspicuous.

[Evaluation Results of Visibility]

As shown in Table 1, the visibility of the image was ◎ for the samples 1 to 7 as the examples. The visibility was ◎ for the sample 8 as the untreated comparative example, and was ◎ for the sample 9 as the comparative example subjected to the wet blasting with the wide nozzle.

[Evaluation of Writing Feel]

A writing feel when characters, figures, and the like were input to the glass substrate 20 with the input pen 50 was evaluated by a sensory test. As an evaluation method, using Pro Pen (KP-503E) manufactured by Wacom Co., Ltd. as the input pen 50, a writing feel on the glass substrate 20 was scored in seven stages from "very comfortable writing" to "very uncomfortable writing" by a total of 20 men and women in their 20s and 50s, and was evaluated with an average score thereof.

[Evaluation Results of Writing Feel]

As shown in Table 1, the writing feel was 4.1 or more for the samples 1 to 7 as the examples, and was 3.9 or less for the sample 8 as the untreated comparative example and the sample 9 as the comparative example subjected to the wet blasting with the wide nozzle.

[Comprehensive Evaluations of Samples]

Figure 4:
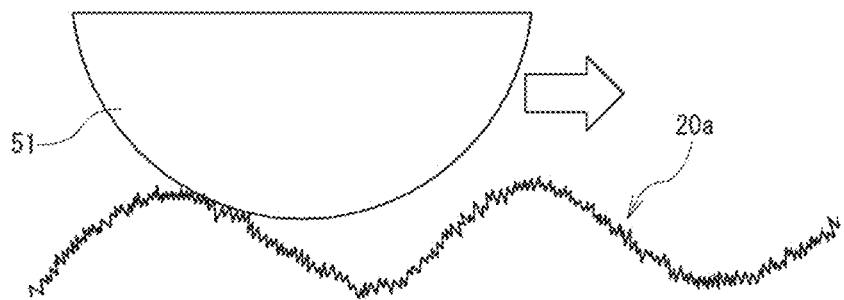
FIG. 4 is a diagram showing a state in which a nib is in contact with a principal surface of a glass substrate on which two types of large and small recesses and protrusions having different pitches of recesses and protrusions are formed.

As shown in Table 1 and FIG. 4, for the samples 1 to 7 as the examples, due to the two types of large and small recesses and protrusions having different pitches of appropriate recesses and protrusions formed on the principal surface 20a with which the nib 51 of the input pen 50 contacts, sliding of the nib 51 on the principal surface 20a of the glass substrate 20 was suppressed. Also, by a combination of moderate increase and decrease in frictional force between the nib 51 and the principal surface 20a, good evaluation results such as a good writing feel and visibility of ◎ were obtained.

On the other hand, for the sample 8 as the untreated comparative example, since the principal surface 20a with which the input pen 50 contacts has small recesses and protrusions and is slippery, the writing feel was bad.

Figure 5:
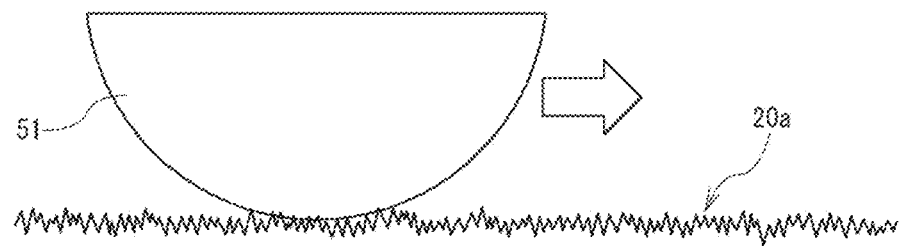
FIG. 5 is a diagram showing a state in which a nib is in contact with a principal surface of a glass substrate without having two types of large and small recesses and protrusions having different pitches of recesses and protrusions.

Also, as shown in FIG. 5, the sample 9 as the comparative example subjected to the wet blasting with the wide nozzle does not have two types of large and small recesses and protrusions having different pitches of recesses and protrusions, so the nib 51 was too difficult to slide and caught, and the writing feel was bad.

INDUSTRIAL APPLICABILITY

The present invention can be used for an input device that can input characters, figures, and the like using input means such as an input pen, and for a cover member for the input device included in the input device. Particularly, the present invention can be used for a cover member for an input device disposed on a front-surface side of a display device in the input device and having at least one principal surface with recesses and protrusions, and for an input device including the cover member for the input device.

REFERENCE SIGNS LIST

10 Input device
20 Glass substrate
20a Principal surface
30 Display element
40 Digitizer circuit
50 Input pen

The invention claimed is:

1. A cover member for an input device disposed on a front-surface side of a display device in the input device, comprising
   recesses and protrusions on at least one principal surface,
   wherein in the principal surface having the recesses and protrusions,
   when a cutoff value for a high-pass filter λc is set to a value 1.6 times a pitch of recesses and protrusions of a measured cross-sectional curve and a cutoff value for a low-pass filter λs is set to 25 μm, a maximum roughness height of the recesses and protrusions is 3 to 1000 nm and a pitch of the recesses and protrusions is 50 to 1000 μm, and when a cutoff value for a high-pass filter λc is set to 25 μm, a three-dimensional arithmetic mean height Sa of the recesses and protrusions is 1-50 nm and a pitch of the recesses and protrusions is 0.01 to 10 μm.

2. The cover member for an input device according to claim 1, wherein a haze is less than 10% in a wavelength range of visible light.

3. An input device comprising:
the cover member for an input device according to claim 2; a display device; and a detection circuit for detecting an input.

4. The input device according to claim 3, comprising an input pen that performs an input to the input device by moving in contact with a principal surface of the cover member for an input device.

5. An input device comprising:
the cover member for an input device according to claim 1; a display device; and a detection circuit for detecting an input.

6. The input device according to claim 5, comprising an input pen that performs an input to the input device by moving in contact with a principal surface of the cover member for an input device.

* * * * *